United States Patent [19]

Hara et al.

[11] Patent Number: 4,639,503

[45] Date of Patent: Jan. 27, 1987

[54] THERMOSETTING RESIN COMPOSITION

[75] Inventors: Hajime Hara, Fujisawa; Shingo Orii; Kazuho Aoyama, both of Kawasaki; Masami Enomoto, Yokohama, all of Japan

[73] Assignee: Nippon Oil Co., Ltd., Tokyo, Japan

[21] Appl. No.: 798,426

[22] Filed: Nov. 15, 1985

[51] Int. Cl.⁴ .............................................. C08G 59/62
[52] U.S. Cl. ..................................... 528/92; 525/109; 525/502; 528/98; 528/101; 528/104
[58] Field of Search ................. 528/98, 92, 101, 104; 525/109, 502

[56] References Cited

U.S. PATENT DOCUMENTS

| | | | |
|---|---|---|---|
| 3,069,373 | 12/1962 | Greenlee | 525/109 X |
| 3,770,698 | 11/1973 | Riew | 525/109 X |
| 3,966,837 | 6/1976 | Riew | 525/109 X |
| 4,388,451 | 6/1983 | Culbertson et al. | 525/109 X |
| 4,578,425 | 3/1986 | Santorelli | 525/109 |

*Primary Examiner*—Earl Nielsen
*Attorney, Agent, or Firm*—Bucknam and Archer

[57] ABSTRACT

A thermosetting resin composition having an improved crack resistance comprising 100 weight parts of a curable epoxy resin and 30 to 300 weight parts of a phenol compound-added conjugated diolefin polymer, which is prepared in the presence of aluminum phenoxide as the catalyst. The composition is suitable for resin encapsulation of electronic components.

1 Claim, No Drawings

THERMOSETTING RESIN COMPOSITION

BACKGROUND OF THE INVENTION

1. Field of the Invention

This invention relates to a thermosetting resin composition and more particularly it relates to a thermosetting resin composition which will exhibit not only good mechanical properties, electrical properties and a good water resistance but also an improved crack resistance when used as an impervious encapsulation material of an electronic component.

2. Description of the Prior Art

Heat dissipation has recently presented a serious problem with the increase of degree of integration in a resin-encapsulated electronic component. Reduction in the thickness and size of electronic parts has intensively been effected. Furthermore, practical service conditions of the parts have become increasingly severe, resulting in frequent occurrence of peeling of an encapsulating material from an encapsulated member and cracking of the encapsulating material itself due to repeated heat cycles during the use of the parts. This may sometimes lead to deteriorate the electronic parts.

As a countermeasure against these problems, there has heretofore been employed, for example, a method in which a large amount of an inorganic filler is incorporated in a resin to approximate the volumetric coefficient of thermal expansion of an encapsulating material to that of a member to be encapsulated therewith. However, with an increase in the amount of an inorganic filler blended, it is increasingly likely not only that the inorganic filler might damage the surface of the encapsulated member, but also that the workability of the filler-blended encapsulating material is lowered disadvantageously because of the increased viscosity, thus presenting a big difficulty in handling particularly in the case of use of said blended encapsulating material as a liquid encapsulation material.

As another countermeasure, there has been an attempt to blend a flexibilizer (that is, a flexibility-providing agent) with a resin. A glycidyl ether derived from a polyalcohol such as 1,4-butanediol, poly(alkylene oxide)glycols, or glycerin is wellknown as a flexibilizer. However, the reactive flexibilizers of this kind cannot make a sufficient expected improvement in the flexibility of the resin and, what is worse, it is defective in that they markedly lower the electric properties, heat resistance, and water resistance of the encapsulated material.

On the other hand, it is known that a butadiene polymer, an epoxidized butadiene polymer or a butadiene polymer-modified epoxy resin can be used to improve the crack resistance of an encapsulated material. When a butadiene polymer is used as such an improver, it exhibits poor compatibility with an epoxy resin so that it cannot be homogeneously blended with the epoxy resin or it moves to the surface of a molding in the course of molding. This spoils the appearance of the molding, leading to reduction in the commercial value.

When an epoxidized butadiene polymer is used, a uniform cured product disadvantageously cannot be obtained since the reactivity of the epoxy groups of epoxidized butadiene polymer is notably lower than those of the epoxy groups of a bisphenol A type epoxy resin and a novolak type epoxy resin.

The butadiene polymer-modified epoxy resin is prepared by reacting a butadiene polymer having carboxyl groups at its terminals with an epoxy resin. In the preparation, alcoholic hydroxyl groups formed in a reaction of carboxyl groups with epoxy groups are further reacted with epoxy groups, thus presenting a problem that a final product is liable to have a three-dimensional network structure which make the molding composition difficult to cause to flow and to fill the mold satisfactorily. Another disadvantage is that the butadiene-modified epoxy resins are expensive.

SUMMARY OF THE INVENTION

An object of this invention is to provide a thermosetting resin composition suitable for resin encapsulating of electronic components, which has good mechanical and electrical properties as well as a good water resistance, and which is improved in crack resistance.

Specifically, in accordance with the present invention, there is provided a thermosetting resin composition comprising as the essential components: (1) 100 weight parts of a curable epoxy resin; and (2) 30 to 300 weight parts of a phenol adduct of a conjugated diolefin polymer prepared by the addition reaction of a phenol compound with a conjugated diolefin homopolymer compound having a number-average molecular weight of 300 to 10,000 or a conjugated diolefin copolymer containing at least 50 mol % of conjugated diolefin monomer units and having the same molecular weight as above in the presence of aluminum phenoxide as the catalyst.

DETAILED DESCRIPTION OF PREFERRED EMBODIMENTS

The composition of this invention will now be described in detail. The curable epoxy resin to be used as the component (1) in the present invention has at least one epoxy group, preferably two or more epoxy groups, in the molecule. Examples of the curable epoxy resin include epoxy resins prepared from epichlorohydrin and bisphenol A or a novolak resin, alicyclic epoxy resins, and epoxy resins derived from halogenated bisphenol A.

The phenol adduct of a conjugated diolefin polymer to be used as the component (2) in the present invention is prepared by reacting a conjugated diolefin polymer with a phenol compound in the presence of aluminum phenoxide as the catalyst.

The conjugated diolefin polymer that can be used in the present invention is a conjugated diolefin homopolymer having a number-average molecular weight of 300 to 10,000, particularly 500 to 5,000, or a conjugated diolefin copolymer containing 50 mol % or more of conjugated diolefin monomer units and having the same molecular weight as above, which is prepared according to any conventional method.

Specifically, according to a representative preparation method, a conjugated diolefin having 4 to 10 carbon atoms, e.g. butadiene, isoprene, or 1,3-pentadiene, alone, a combination of diolefins just as mentioned above, or a combination of a conjugated diolefin and 50 mol% or less of an aromatic vinyl monomer such as styrene, α-methylstyrene, vinyltoluene, or divinylbenzene is subjected to anionic polymerization or copolymerization in the presence of an alkali metal or an organoalkalimetal compound as the catalyst at a temperature of 0° to 100° C. In this case, control of the molecular weight to obtain a light colored low molecular weight polymer containing little gel portions, etc. can be attained by a chain transfer polymerization method using an organoalkalimetal compound, such as benzylsodium, as the catalyst and a compound having an alkylaryl group, such as toluene, as the chain transfer agent (U.S. Pat. No. 3,789,090), a living polymerization method using a polynuclear aromatic compound, such as naphthalene, as the activator and an alkali metal, such as sodium, as the catalyst in a solvent of tetrahydrofuran (Japanese Patent Publications Nos. 17,485/1967 and 27,432/1968), or a polymerization method using a dispersion of an alkali metal, such as sodium, as the catalyst and an ether, such as dioxane, added for controlling the molecular weight in a solvent of an aromatic hydrocarbon such as toluene or xylene (Japanese Patent Publications Nos. 7446/1957, 1245/1963, and 10,188/1959). There also may be used a low molecular weight polymer prepared according to anionic coordination polymerization using an acetylacetonate compound of a Group VIII metal, such as cobalt or nickel, and an alkylaluminum halide, as the catalyst (Japanese Patent Publications Nos. 507/1970 and 80,300/1971).

The phenol compounds which can be used include a monohydric phenol compound such as phenol, cresol, or xylol, and a polyhydric phenol compound such as hydroquinone, resorcinol, and bisphenol A.

In the addition reaction of a phenol compound to a conjugated diolefin polymer, sulfuric acid, p-toluenesulfonic acid, methanesulfonic acid, boron trifluoride, boron trifluoride/ether complex, boron trifluoride/phenol complex, aluminum chloride, perchloric acid, or the like is usually used as the catalyst. However, undesirable side-reactions such as polymerization or cyclization via double bonds of the conjugated diolefin polymer also occur in the presence of these catalysts Thus they are not a suitable catalyst for the purpose of this invention. In the present invention, aluminum phenoxide is preferably used as the catalyst. Aluminum phenoxide is easily prepared by stirring metallic aluminum, preferably aluminum foils, in the presence of a phenol compound at a temperature of 150° to 250° C. Aluminum phenoxide obtained according to other known methods can be used, too. The addition reaction of a phenol compound to a conjugated diolefin polymer may be usually conducted at 150° to 300° C., preferably at 170° to 250° C. In this way, a phenol adduct of a conjugated diolefin polymer containing 0.02 to 1.0 mol of phenol monomer units added to 100 g of conjugated diolefin polymer units is obtained.

In the present invention, the preparation of aluminum phenoxide as the catalyst and the reaction of a conjugated diolefin polymer with a phenol compound can be conducted in sequence or at the same time as described below.

More specifically, metallic aluminum and a phenol compound is introduced into a reactor to yield aluminum phenoxide. A conjugated diolefin and an additional phenol compound are then added to the reactor to effect a reaction. In this case, when a larger molar amount of a phenol compound than that of aluminum phenoxide to be formed is initially added, the additional phenol compound is not necessary.

Alternatively, when aluminum, a phenol compound, and a conjugated diolefin copolymer are simultaneously added into a reactor and heated at about 150° to 300° C., aluminum phenoxide is initially formed in the system and then catalyzes the alkylation reaction.

The double bonds remaining in the phenol compound-added conjugated diolefin polymer can be saturated by hydrogenation to remarkably improve the long-term heat resistance of the polymer.

In the present invention, 30 to 300 weight parts of the phenol compound-added conjugated diolefin polymer (component (2)) is blended with 100 weight parts of the curable epoxy resin (component (1)). If desired, a novolak phenol resin, a catalyst as a curing promotor, or an inorganic filler may be further blended with the resulting mixture. A known catalyst can be used as the curing promotor. Examples of the curing promotor include tertiary amines such as 2-(dimethylaminomethyl)-phenol, 2,4,6tris(dimethylaminomethyl)phenol, benzyldimethylamine, and α-methylbenzyldimethylamine; imidazoles such as 2-methylimidazole, 2-phenylimidazole, 2-heptadecylimidazole, and 2-ethyl-4-methylimidazole; and phosphines such as triphenylphosphine. The amount of the curing promotor added is 0.1 to 2 wt. % based on the total weight of components (1) and (2).

The inorganic fillers include, for example, crystalline silica powder, quartz glass powder, talc, calcium silicate powder, zirconium silicate powder, alumina powder, calcium carbonate powder, clay, barium sulfate powder, and glass fiber.

The present invention will now be illustrated in detail with reference to Preparation Examples, Examples, and Comparative Examples.

PREPARATION EXAMPLE 1

244 g (2.0 mol) of 2,4-xylenol and 1.6 g of aluminum foils were stirred in a 1 l separable flask at 200° C. for 3 hours to form aluminum phenoxide with all the aluminum foils reacted. Subsequently, the contents of the flask were kept at 170° C. and 300 g of Nisseki polybutadiene (number-average molecular weight: 590, vinyl group content: 51%) was then dropwise added thereto over a period of 50 minutes. After completion of the dropwise addition, the temperature was immediately elevated to 190° C., at which the reaction was continued for 3 hours to add 75% of the 2,4-xylenol to the polybutadiene. After completion of the reaction, the aluminum phenoxide was inactivated, and the catalyst residue was removed by filtration. The unreacted 2,4-xylenol was finally distilled off under reduced pressure. A 2,4-xylenol-added butadiene polymer containing 0.5 mol of 2,4-xylenol monomer units per 100 g of the butadiene polymer was obtained. $^{13}$C-NMR spectroscopy and hydroxyl group determination revealed that no substantial 2,4-xylenol monomer units added to the butadiene polymer via ether bonds were present. When this adduct was dissolved in a solvent mixture of n-heptane and ethanol and hydrogenated in the presence of Pd-carbon as the catalyst at 100° C., the double bonds were completely hydrogenated.

PREPARATION EXAMPLE 2

216 g (2.0 mol) of o-cresol and 1.6 g of aluminum foils were reacted at 180° C. for 2 hours. All the aluminum foils were reacted. Subsequently, the contents of the flask were kept at 170° C. and 300 g of Nisseki polybutadiene (number-average molecular weight: 590, vinyl group content: 51%) was dropwise added thereto over a period of 50 minutes. After completion of the dropwise addition, the temperature was immediately elevated to 190° C., at which the reaction was continued for 3 hours.

63% of o-cresol was reacted. An o-cresol-added butadiene polymer containing 0.42 mol of o-cresol monomer units per 100 g of the polybutadiene polymer was obtained. This adduct was hydrogenated under the same conditions as in Preparation Example 1. An adduct having the double bonds completely hydrogenated was obtained.

PREPARATION EXAMPLE 3

183 g (1.5 mol) of 2,4-xylenol and 1.2 g of aluminum foils were reacted at 200° C. for 3 hours. All the aluminum foils were reacted. Subsequently, the contents of the flask were kept at 170° C. and 300 g of Nisseki polybutadiene (number-average molecular weight: 1,150, vinyl group content: 64%) was dropwise added thereto over a period of 50 minutes. After completion of the dropwise addition, the temperature was immediately elevated to 190° C., at which the reaction was continued for 1.5 hours. 64% of the 2,4-xylenol was reacted. A 2,4-xylenol-added butadiene polymer containing 0.32 mol of 2,4-xylenol monomer units per 100 g of the butadiene polymer was obtained. This adduct was hydrogenated under the same conditions as in Preparation Example 1. An adduct having the double bonds completely hydrogenated was obtained.

EXAMPLES 1 TO 3 AND COMPARATIVE EXAMPLE 1

The phenol adduct of butadiene polymers obtained in Preparation Examples 1 to 3, Epikote 828 (a product of Yuka Shell Epoxy K.K.), and 2-ethyl-4-methylimidazole as the curing promotor were blended in proportions as shown in Table 1. The properties of cured products of the resulting compositions are shown in Table 1. For comparison, the properties of a cured product of a composition containing Novolak oligomers instead of a phenol adduct of a butadiene polymer are shown in Table 1. The properties were evaluated in terms of Tg of the cured product and according to a pressure cooker test (125° C., 200 hr) and a heat shock test. The heat shock test was conducted with 100 cycles between −40° and 120° C. using the cured product including a 12 φ spring washer in accordance with JIS C-2105.

TABLE 1

| Blending | Example 1 | Example 2 | Example 3 | Comp. Ex. 1 |
|---|---|---|---|---|
| Epoxy resin | 100 | 100 | 100 | 100 |
| Phenol adduct of a butadiene polymer | 163 | 182 | 148 | 0 |
| Novolak oligomer | 0 | 0 | 20 | 57 |
| 2-Ethyl-4-methylimidazole | 1.5 | 1.5 | 1.5 | 1.5 |
| Curing conditions | 165° C. × 1 hr | 165° C. × 1 hr | 165° C. × 1 hr | 165° C. × 1 hr |
| Tg of cured product | 78 | 80 | 65 | 149 |
| Pressure cooker test (125° C. × 200 hr) | passed | passed | passed | passed |
| Heat shock test | no cracks | no cracks | no cracks | cracks |

COMPARATIVE EXAMPLE 2

163 g (1.5 mol) of o-cresol and 300 g of Nisseki polybutadiene (number-average molecular weight: 1,150, vinyl group content: 64%) used in Preparation Example 3 were reacted in the presence of 3 g of $BF_3$-ethyl ether complex at 50° C. for 5 hours. 43% of the o-cresol was reacted. This corresponds to addition of 0.21 mol of o-cresol to 100 g of the butadiene polymer. GPC analysis showed this adduct included high molecular weight portions highly polymerized unlike the adducts prepared in Preparation Examples 1 to 3. This adduct was incompatible with Epikote 828 (a product of Yuka Shell Epoxy K.K.).

As described above in detail, the phenol adduct of a butadiene polymer to be used in the present invention is effective in imparting flexibility to a cured resin without reduction in moisture resistance when cured with an epoxy resin.

What is claimed is:

1. A thermosetting resin composition comprising as the essential components;
    (1) 100 weight parts of a curable epoxy resin; and
    (2) 30 to 300 weight parts of a phenol adduct of a conjugated diolefin polymer prepared by the addition reaction of a phenol compound with a member selected from the group consisting of a conjugated diolefin homopolymer having a number-average molecular weight of 300 to 10,000 and a conjugated diolefin copolymer containing at least 50 mol % of conjugated diolefin monomer units and having the same molecular weight as above in the presence of aluminum phenoxide as the catalyst.

* * * * *